United States Patent [19]

Van Sloun et al.

[11] 3,775,674

[45] Nov. 27, 1973

[54] FLUX GATE GRADIOMETER USING A PULSE GENERATOR TO DRIVE THE ENERGIZING WINDINGS AS WELL AS ACTUATE THE DETECTOR

[75] Inventors: Peter H. Van Sloun, Hopkins, Minn.; Burton A. Pearlstein, Sharon, Mass.

[73] Assignee: The United States of America as represented by the Secretary of the Air Force

[22] Filed: Jan. 27, 1972

[21] Appl. No.: 221,474

[52] U.S. Cl. .............................................. 324/43 G
[51] Int. Cl. ............................................. G01r 33/04
[58] Field of Search ................... 324/43 R, 43 G, 47

[56] References Cited
UNITED STATES PATENTS

| | | | |
|---|---|---|---|
| 3,286,169 | 11/1966 | Slonczewski | 324/47 |
| 3,541,432 | 11/1970 | Scarbrough | 324/43 R |
| 3,649,908 | 3/1972 | Brown | 324/43 R |

OTHER PUBLICATIONS

Morris et al., Design of Second Harmonic Flux Gate Magnetic Field Gradiometer, Rev. of Scien. Inst., Vol. 32, No. 4, April 1961, pp. 444–448

*Primary Examiner*—Robert J. Corcoran
*Attorney*—Harry A. Herbert, Jr. et al.

[57] ABSTRACT

A gradiometer is provided utilizing two flux gate magnetometers to detect magnetic field strength. The signal is sensed only during the magnetic core saturation drive pulse portion of the cycle, the core driver circuitry acting to control sense windings and drive windings simultaneously. There is provided unidirectional drive of the core, a low duty cycle drive, and interrogation of the sense winding only during the drive pulse. The unidirectional drive of the core and low duty cycle conserve power.

2 Claims, 9 Drawing Figures

FLUX GATE GRADIOMETER USING A PULSE GENERATOR TO DRIVE THE ENERGIZING WINDINGS AS WELL AS ACTUATE THE DETECTOR

BACKGROUND OF THE INVENTION

This invention relates to apparatus for measuring or sensing magnetic fields and more particularly to a magnetic gradiometer utilizing two flux magnetometers to detect magnetic field strength.

The gradiometer of the present invention employs flux gate magnetometers. The flux gate magnetometers are different from the well known second harmonic flux gate magnetometers in the techniques of using pulsed saturation of the magnetic core in a single direction and sensing the signal only during the saturation drive pulse.

A conventional flux-gate magnetometer consists of a saturable, high permeability core with a drive coil and a pickup coil wound around it. The drive coil is used to drive the core into saturation alternately in the two opposite directions along the core axis. The flux lines threading through the pickup coil, then, are the sum of those created by the drive coil and those due to the ambient magnetic field. Since the drive coil saturates the core alternately in the two directions colinear with the core axis, the contributions of the ambient flux to the total flux threading the pickup coil is negligible except at the times at which the sense of saturation is reversing; that is, except when the ambient flux is "gated on" exactly at the cross-over time or the times on the flux versus time curve when the flux B crosses the time axis. The effect of the ambient flux is to shift the crossover instants. When the ambient field is zero, the crossover instants are evenly spaced and this symmetry is upset by the ambient flux when the ambient field is other than zero. In that case, the cross-over points on the negative half cycle on the flux versus time curves are wider spaced than those on the positive half cycle. The curve of flux B versus time with $H_A = O$ contains only even harmonics, whereas the curve with $H_A$ present contains odd harmonics as well as even harmonics. One disadvantage of the conventional flux-gate magnetometer is that it is limited in accuracy, as opposed to sensitivity, by the remnant magnetization of the core, which introduces an uncertainty in the zero level. Another disadvantage is the limitation placed on the sensitivity by certain sources of noise such as the resistance of the output coil, the reflected resistance from the drive coil, and the Barkhausen noise in the core material.

The present gradiometer utilizes two flux gate magnetometers to detect the magnetic field strength. The unique characteristics employed in operating these magnetometers include: unidirectional drive of the core, use of a low 1:41 duty cycle drive, and interrogation of the sense winding only during the drive pulse. The unidirectional drive of the core and low duty cycle conserve power.

SUMMARY OF THE INVENTION

The gradiometer of the present invention utilizes two flux gate magnetometers to detect magnetic field strength. The unique features employed in operating these magnetometers include: unidirectional drive of the core, use of a low duty cycle drive, and interrogation of the sense winding only during the drive pulse. The signal representative of the magnetic field strength is derived from the sense winding by virtue of the flux lines C which were inside of the winding relaxing to the outside when the core is saturated. Signal variations are caused by changes in the number of flux lines concentrated through the core material.

A pulse generator and core driver is used to drive the windings on the core and also to switch sense windings onto the circuitry during the drive pulse. The sense windings drive directly into a differential amplifier. Common mode feedback is used to buck out the ambient field in which the sensor rests. A balance feedback is used to null out any gradient that may be seen as the sensor comes to rest. A signal amplifier increases the signal level of the output from the differential amplifier.

DESCRIPTION OF THE DRAWINGS

FIGS. 1a–1e illustrate the flux gate function;
FIG. 1A is a graphic representation of the core;
FIG. 1B shows the core material as it is in the unexcited state;
FIG. 1C shows the sensor with the drive windings excited.

DETAILED DESCRIPTION OF THE PREFERRED EMBODIMENT

The gradiometer utilizes two flux gate magnetometers to detect the magnetic field strength. The unique characteristics employed in operating these magnetometers include: unidirectional drive of the core, use of a low 1:41 duty cycle drive, and interrogation of the sense winding only during the drive pulse. The unidirectional drive of the core and low duty cycle conserve power.

Figure 1A:
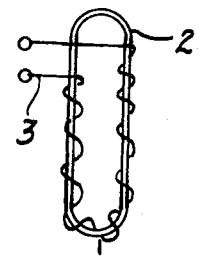
Figure 1B:
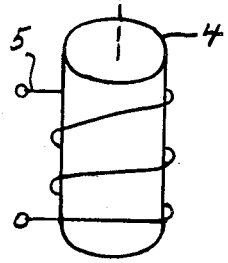
Figure 1B:
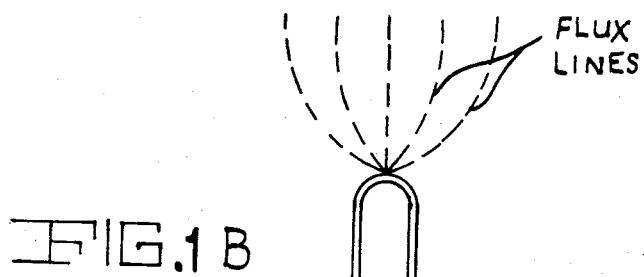
Figure 1C:
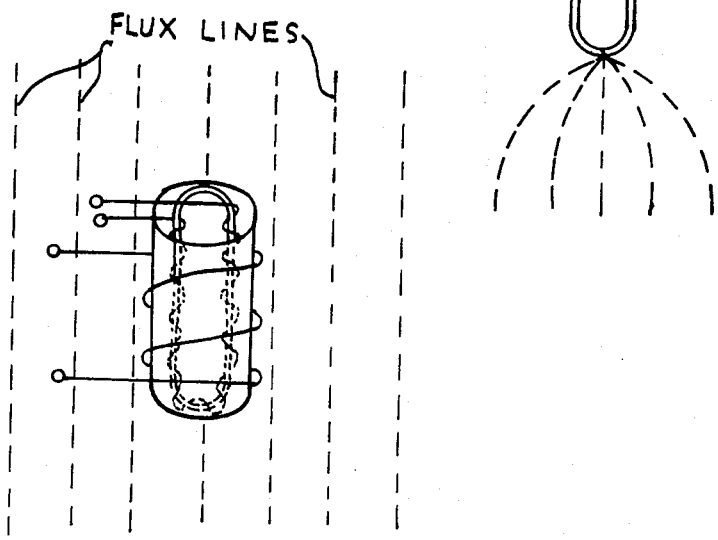

A graphic representation of the core and its function are given in FIGS. 1A, 1B, and 1C. Referring to FIG. 1A, core material 2 is mo-permalloy 4–79. This is a high permeable material. Drive windings 3 are wrapped around core material 2 and saturate it when excited. This excitation effectively reduces the permeability of the core as viewed from the outside from very high to approximately one. Sense winding 5 is wound around bobbin 4 as shown. When assembled, core 2 is inside sense winding bobbin 4.

View of FIG. 1B shows the core material as it is in the unexcited state. That is, the permeability as viewed from the outside is very high, thus the flux lines are concentrated through it as shown.

View of FIG. 1C shows the sensor with the drive windings excited, thus having the core material fully saturated. In this condition the saturated core permeability looks as if it is reduced to nearly one as observed from the outside. Thus, the flux lines are not concentrated through it. Note that the drive windings drive one-half of the core up and the other half down thus cancelling the resultant coupling to the sense winding. FIG. 1C also illustrates one assembly, however there are two assemblies provided with each assembly having an associated feedback winding.

The signal representative of the magnetic field strength is derived from the sense winding by virtue of the flux lines which were inside of the winding relaxing to the outside when the core is saturated. Signal variations are caused by changes in the number of flux lines concentrated through the core material.

Figure 2:
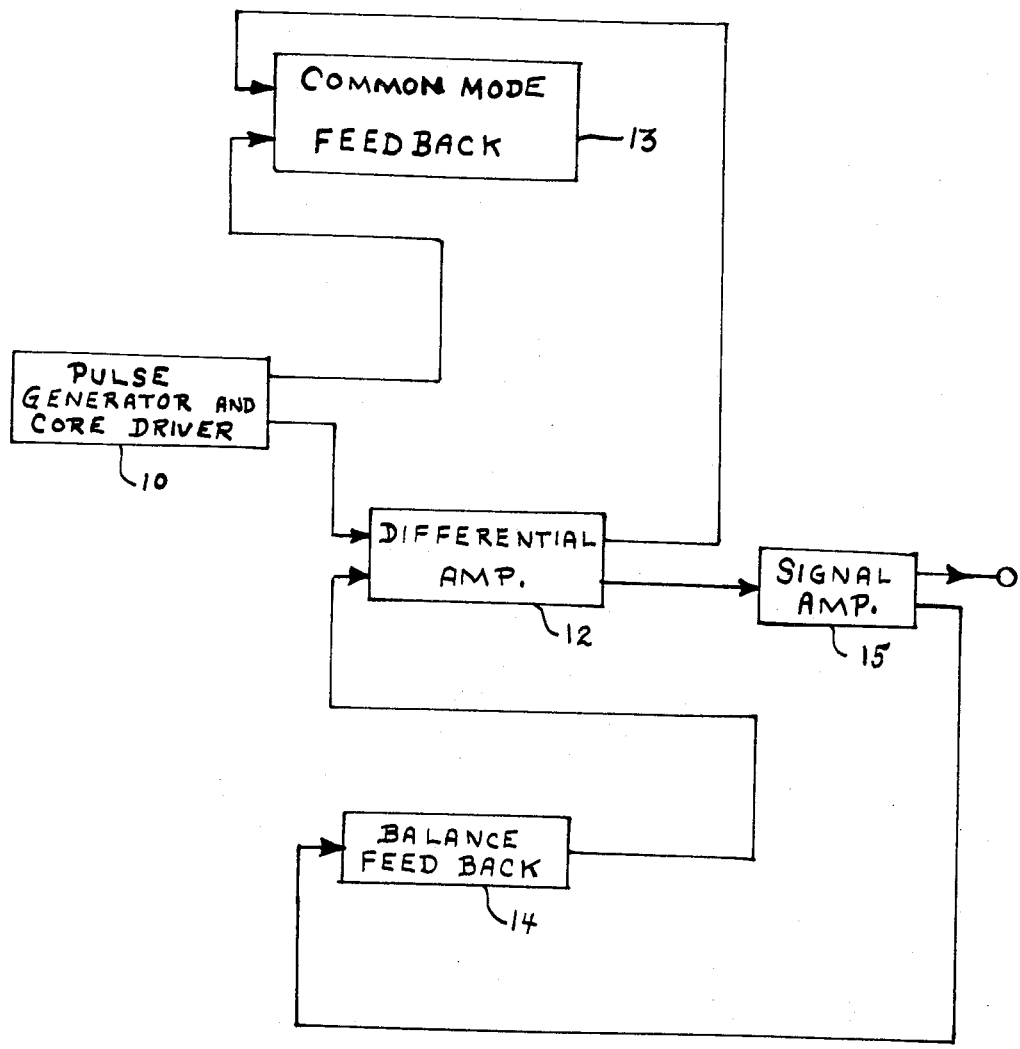
FIG. 2 shows a block diagram of the gradiometer.

For ease in presentation of the operation of the gradiometer, a block diagram of it is given in FIG. 2. Pulse generator and core driver 10 is used to drive the windings on the core and also to switch the sense windings onto the circuitry during the drive pulse. The sense windings drive directly into differential amplifier 12. Common mode feedback 13 is used to buck out the ambient field in which the sensor rests.

Balance feedback 14 is used to null out any gradient that may be seen as the sensor comes to rest. Signal amplifier 15 increases the signal level for the next section. Each block is explained with the use of a schematic diagram hereafter.

Figure 3:
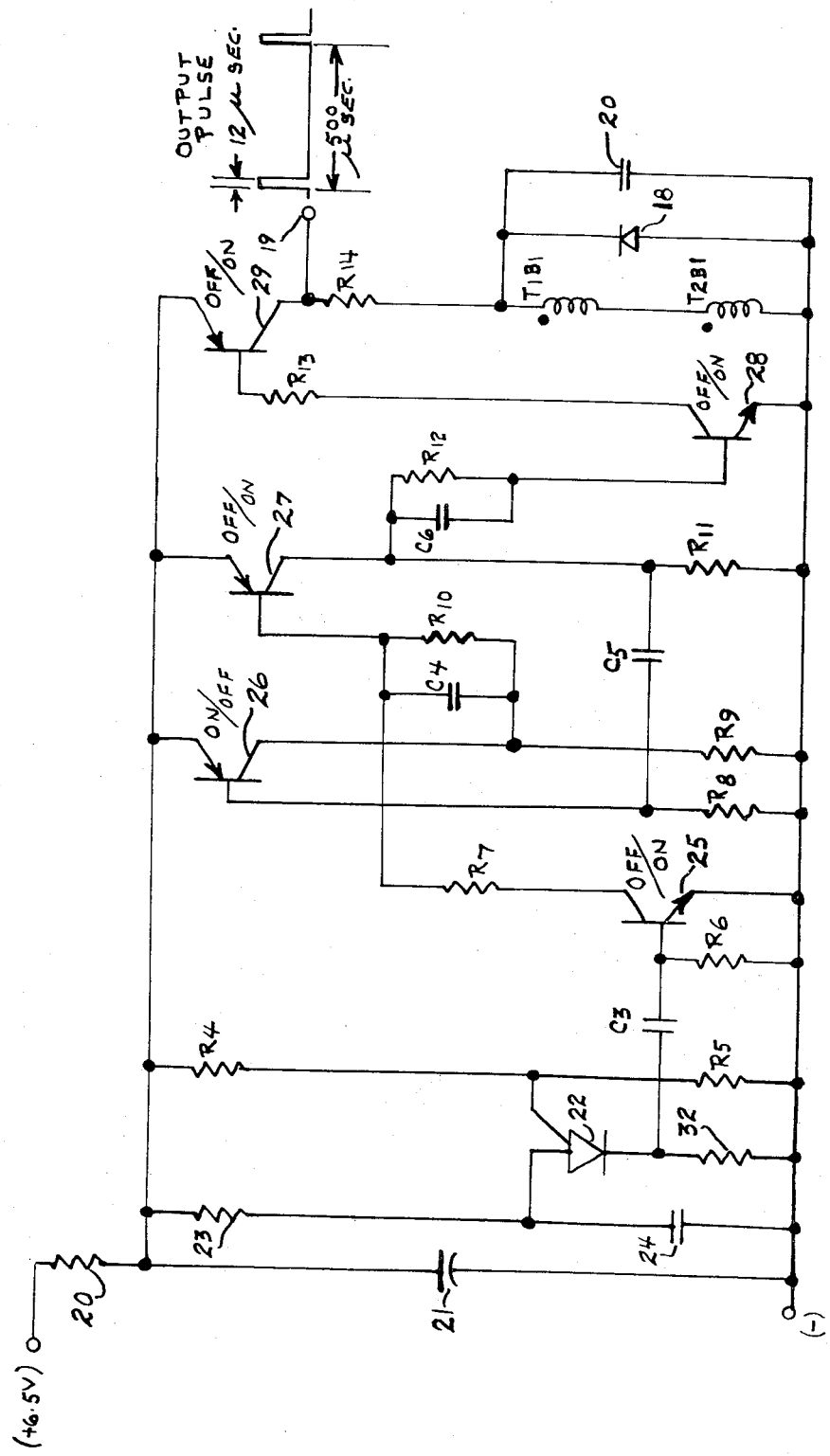
FIG. 3 is a schematic diagram of pulse generator and core driver 10 of FIG. 2.

The pulse generator and core driver schematic diagram is shown on FIG. 3. This section drives the core into saturation with a pulse width of 12 microseconds every 500 microseconds. The 12 microseconds pulses are also fed to common mode feedback 13 and to differential amplifier 12 and used there in switching. Resistor 20 and capacitor 21 provide decoupling from the power supply which is required due to the pulse type loading of the cores. A basic 2 kilohertz oscillator is formed by a programmable unijunction transistor 22 and its associated circuitry. Resistor 23 and capacitor 24 form the basic frequency. Transistor 25 is used to trigger the monostable multivibrator which generates the 12 microsecond width pulse. The monostable multivibrator is formed by transistors 26 and 27 along with their associated circuitry. Transistors 28 and 29 amplify the signal to drive windings T1B1 and T2B1 on the cores of two flux gate magnetometers. Diode 18 and capacitor 20 are in parallel across winding T1B1 and T2B1. Terminal 19 provides output pulse A.

Figure 4:
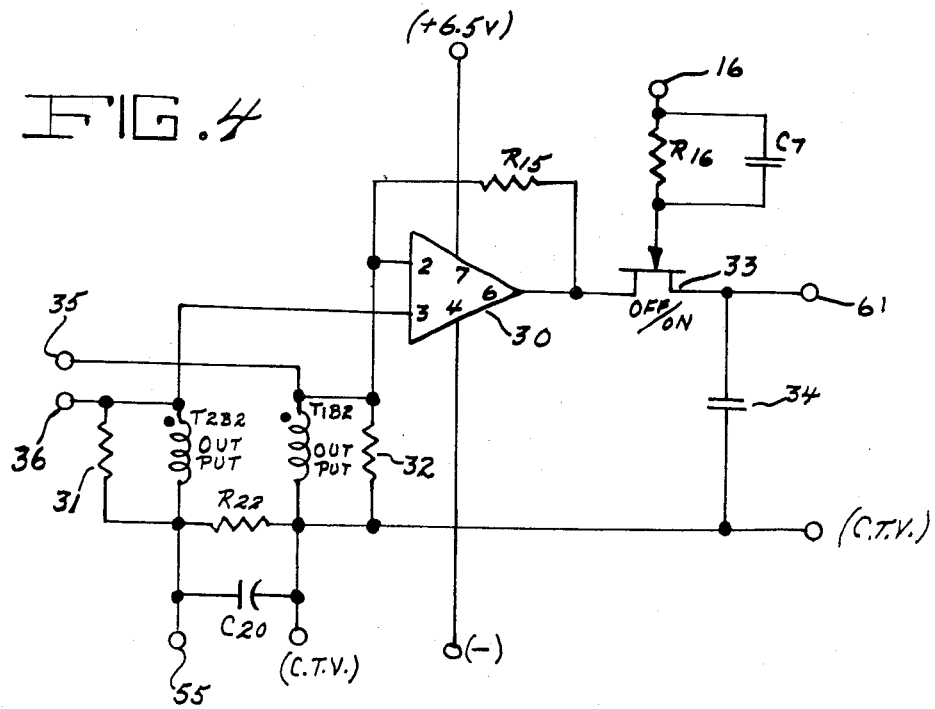
FIG. 4 illustrates a schematic diagram of the differential amplifier of FIG. 2.
Figure 6:
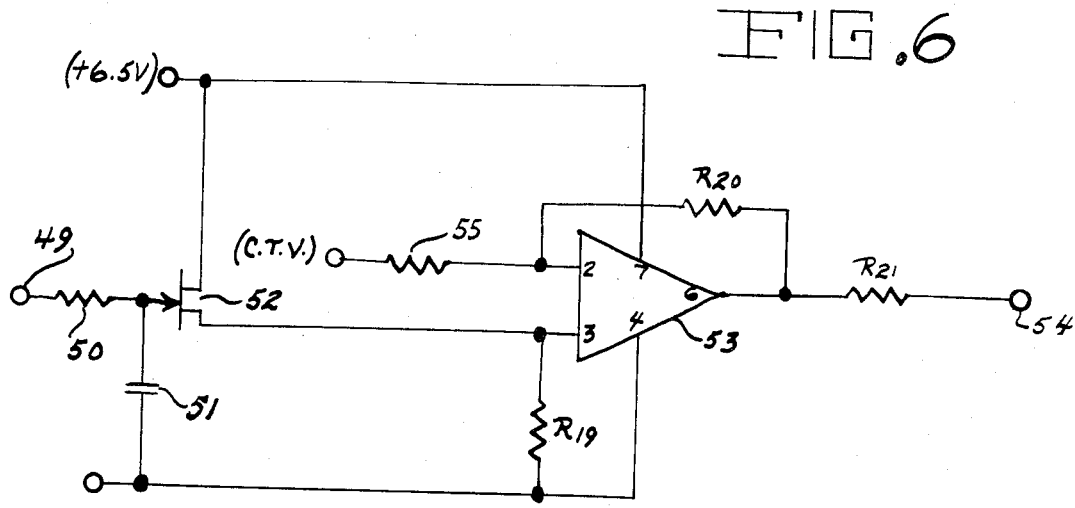
FIG. 6 is a schematic diagram of the balance feedback component of FIG. 1.

The differential amplifier schematic diagram is given in FIG. 4. Operational amplifier 30 is used in this circuit. Its inputs are from two sensor windings T1B2 and T2B2, one from each sensor core. Resistors 31 and 32 are connected directly across the sense windings to optimize their output. Resistor 55 is used in balance feedback of FIG. 6 to bias the sense winding from core No. 2 up or down to balance out any gradient that may be present. In operation both sense windings put out a voltage signal to the operational amplifier. The difference between the two signals is amplified. Transistor 33 is a field effect transistor used as a switch. Its switching signal comes from terminal 19 of pulse generator and core driver 10 by way of terminal 16. The switch 33 is turned on only during the 12 microsecond pulse. The on resistance of transistor 33 and capacitor 34 forms an integrator to remove the amplitude modulation of the signal. This signal is transmitted to the signal amplifier. The sense winding outputs are fed to the common mode feedback section in addition to feeding the differential amplifier. The outputs of sense windings T1B2 and T2B2 are available at terminals 35 and 36, respectively.

Figure 5:
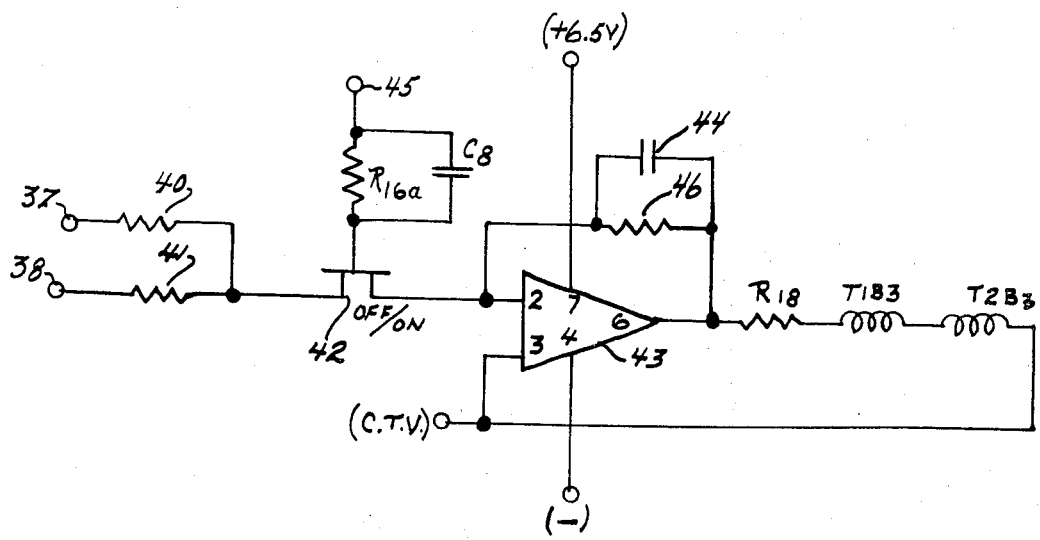
FIG. 5 shows in schematic diagram form the common mode feedback component of FIG. 2.

A schematic diagram of the common mode feedback section is given in FIG. 5. Resistors 40 and 41 receive the signal from the sense windings by way of terminals 37 and 38 from terminals 35 and 36, respectively, of FIG. 4, and take the average between the two. This signal is switched on by transistor 42 only during the 12 microseconds pulse upon the receipt at terminal 45 of a pulse from terminal 19 of FIG. 3. The objective of this feedback section is to reduce its input to near zero by means of the feedback winding via magnetic feedback. This feedback bucks out the ambient field. The operational amplifier 43 is used in a sample and hold configuration. This is achieved by capacitor 44 and resistor 46 in its feedback loop. The amplifier can drive the windings T1B3 and T2B3 so that they produce a bucking field in either direction, thus effectively cancelling the earth's ambient field. The earth's ambient field is cancelled for two reasons: first, to reduce the signal level output at the sense windings so that the common mode rejection feature of the operational amplifier is not exceeded; and secondly, to reduce the noise level of the signal.

The balance feedback component of FIG. 2 is used to keep the signal within a good dynamic range and establish a zero level gradient at the output. It also cancels a gradient in the field that the gradiometer may be required to operate in. A schematic diagram is given in FIG. 6. Resistor 50 and capacitor 51 form a very long time constant which prevents signals in the desired frequency range from effecting the balance feedback section. A field effect transistor 52 is used for impedance matching. An operational amplifier 53 is used to drive the balance feedback in the differential amplifier section. This feedback establishes the voltage level from which the second core sense winding will operate from, thus establishing a zero output in the quiescent condition. It is noted that terminal 49 receives a signal from signal amplifier 15 of FIG. 2 and terminal 54 provides an output to terminal 55 of the differential amplifier of FIG. 4.

Figure 7:
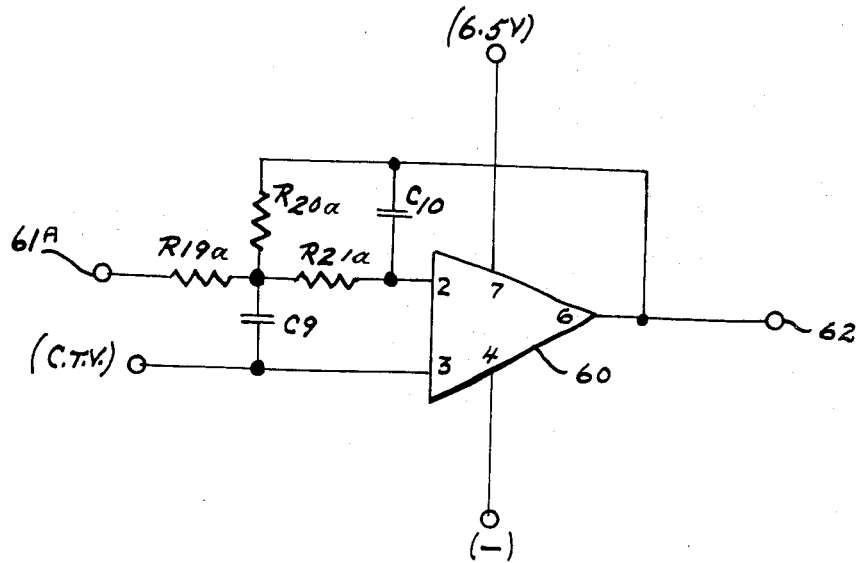
FIG. 7 is the amplifier schematic.

The signal amplifier of FIG. 2 is used to increase the signal voltage and to limit its frequency response. It has a frequency cutoff at approximately 5 hertz. The amplifier schematic is shown in FIG. 7. An operational amplifier 60 is used in the standard low pass configuration. The input signal from output terminal 61 of the differential amplifier of FIG. 4 is received at input terminal 61 and the output signal from terminal 62 is fed to terminal 49 of the balance feedback component of FIG. 6.

It is noted that two flux magnometers are utilized to detect the magnetic field strength. There are a pair of assemblies utilized, one of which is illustrated in FIG. 1C. The schematic representation of the windings are illustrated in FIG. 3 which shows drive windings T1B1 and T2B1. FIG. 4 shows the connections for sense windings T1B2 and T2B2. Also provided are a pair of feedback windings associated with the flux magnetometers for bucking out the ambient field. They are shown as T1B3 and T2B3 of FIG. 5. The foregoing windings have been illustrated as previously described for purposes of clarity although they actually are shown in the assembly of FIG. 1C.

What is claimed is:

1. A gradiometer to detect magnetic fields comprising first and second flux gate magnetometers serving as a sensor for magnetic fields, each of said flux gate magnetometers including a magnetic core, a drive winding, and a sense winding, said drive being connected in a series arrangement, pulse generating means providing pulses having a preselected time duration at a predetermined pulse repetition rate, said pulses driving said series arrangement, a differential amplifier having first and second inputs, said first input receiving the output signal of one sense winding, and the second input the output signal from the other sense winding, a first switch, normally off, in the output path of said differential amplifier, said first switch connected to said pulse generator and upon receipt of pulses from the generator means being turned on for the duration of each received pulse to permit output signals from said differential amplifier to pass therethrough, means connected to said sense windings to generate a bucking field in either direction for said two flux gate magnetometers to cancel out the earth's ambient field, means connected to said first switch to amplify the difference signal from said differential amplifier to provide an output signal representative of the detected magnetic field, and means connected to said means to amplify to establish the voltage level which said second sense winding operates from thus permitting the establishment of a zero output in the quiescent condition, said means establishing said voltage level including a resistor and capacitor network receiving said signal representative of said detected magnetic fields, said network having a long time constant, an amplifier, transistor impedance matching means interconnecting said network and said amplifier, the output signal from said amplifier being received by one of the inputs to said differential amplifier.

2. A gradiometer as described in claim 1 wherein the means to generate a bucking field is comprised of means to average the signals from said sense windings, switch means connected to said pulse generator and said means to average and actuated by said pulses from said pulse generating means to switch on the average signal during said preselected time duration, an amplifier receiving the average signal, a pair of feedback windings associated with said two flux gage megnetometers, said feedback windings receiving the amplified average signal.

* * * * *